United States Patent [19]

Toyama et al.

[11] Patent Number: 5,130,709
[45] Date of Patent: Jul. 14, 1992

[54] NAVIGATION APPARATUS FOR VEHICLE

[75] Inventors: Yasuhiro Toyama; Takashi Yamada, both of Anjo, Japan

[73] Assignees: Aisin AW Co., Ltd.; Kabushiki Kaisha Shinsangyokaihatsu, both of Japan

[21] Appl. No.: 686,288

[22] Filed: Apr. 16, 1991

Related U.S. Application Data

[63] Continuation of Ser. No. 408,499, Aug. 23, 1989, abandoned.

[30] Foreign Application Priority Data

Dec. 28, 1987 [JP] Japan .................. 62-333058

[51] Int. Cl.$^5$ ................................. G08G 1/12
[52] U.S. Cl. ..................... 340/995; 73/178 R; 340/990; 358/103; 364/449
[58] Field of Search ............. 340/988, 990, 995; 73/178 R; 364/444, 449, 460; 358/103

[56] References Cited

U.S. PATENT DOCUMENTS

| 3,775,743 | 11/1973 | Carter | 340/905 |
|---|---|---|---|
| 4,774,671 | 9/1988 | Itoh et al. | 340/995 |
| 4,774,672 | 9/1988 | Tsunada et al. | 340/995 |
| 4,812,845 | 3/1989 | Yamada et al. | 340/988 |
| 4,827,420 | 5/1989 | Musa | 340/995 |
| 4,862,047 | 8/1989 | Suzuki et al. | 358/103 |
| 4,937,751 | 6/1990 | Nimura et al. | 340/995 |
| 4,996,645 | 2/1991 | Schneyderberg Van Der Zon | 340/995 |

FOREIGN PATENT DOCUMENTS

| 0135740 | 4/1985 | European Pat. Off. | 340/905 |
|---|---|---|---|
| 0172917 | 7/1988 | Japan | 340/995 |
| 0233314 | 9/1988 | Japan | 340/995 |

Primary Examiner—Jin F. Ng
Assistant Examiner—Brent A. Swarthout
Attorney, Agent, or Firm—Lorusso & Loud

[57] ABSTRACT

A navigation apparatus for a vehicle according to the present invention is designed to compare the distance from the previous intersection or feature to a further feature with the value from an odometer (2) and then to forcibly zero the remaining distance to the further feature when the difference between the distance and the value of the odometer becomes equal to or smaller than a predetermined value and when the feature is detected by a radar (12) or a road surface sensor (13). In consequence, even if the vehicle has to travel a long distance before it reaches an intersection where it makes a turn, a correct travelled distance can be obtained by correcting the distance detection errors as each feature is detected, thereby enabling a correct present position to be detected.

9 Claims, 6 Drawing Sheets

NAVIGATION APPARATUS FOR VEHICLE

This application is a continuation of application Ser. No. 07/408,499, filed Aug. 8, 1989, now abandoned.

TECHNICAL FIELD

The present invention relates to a navigation apparatus for a vehicle of the type which navigates a vehicle on a predetermined course and which enables a correct present position to be obtained on the course on a map.

BACKGROUND ART

One type of prior art navigation apparatus for a vehicle includes an odometer for detecting the distance over which a vehicle travels, a bearing sensor for detecting the direction of progress of a vehicle, and a map storage device. Such a navigation apparatus is capable of only displaying the present position of the vehicle on the map image read from the map storage device.

FIG. 8 shows the configuration of the above-described conventional navigation apparatus for a vehicle. The navigation apparatus includes a map storage device 1, an odometer 2, a bearing sensor 3, a switch and a touch panel 4, an input interface 5, an internal bus 6, a central processing unit 7, a RAM 8, a ROM 9, an output interface 10, and a CRT 11.

The map storage device 1 which stores map data may be in the form of a video disk, a video tape, CDROM or the like. Map data on a desired area in the map data stored in the map storage device is read out and displayed on the CRT 11. The odometer 2 generally generates distance data for unit distance by detecting the angular velocity of the wheel. The bearing sensor 3 generally generates bearing data by detecting the geomagnetic bearing corresponding to the direction of progress of the vehicle. The distance over which the vehicle travels after it has left the starting point and the direction in which the vehicle travels or whether the vehicle turns right or left are detected by a combination of the odometer 2 and the bearing sensor 3. The CPU calculates the present position of the vehicle on a predetermined course using the measured data, and displays the obtained data on the map. A driver inputs data such as a destination, enlargement of the map and so on through the switch and touch panel 4 when the navigation is to be started so as to input the destination, the present position of the vehicle and so on in the RAM 8. The touch panel may be provided on the screen of the CRT 11. When the driver selectively touches a desired touch area in a plurality of touch areas, a corresponding signal is generated. The inputs interface 5 is a signal converter through which the input from the sensors, the storage device and the switches are sent to the internal bus 6. The ROM 9 stores programs for inputting/outputting the various types of data through the input interface 5, the output interface 10 and the internal bus 6, as well as those for processing the data. The programs are executed by the CPU 7.

The odometer in the conventional navigation apparatus determines the angular velocity of the wheel and calculates the distance over which the vehicle travels using the measured value of the angular velocity and the radius of the wheel. However, the radius of the wheel may vary owing to the air pressure or to wear thereof. Further, the vehicle may travel at a slant, for example, when it changes traffic lanes. These factors generate errors in the distance measured, resulting in the erroneous detection of a present position M, as shown in FIGS. 9 and 10.

In order to eliminate this problem, the present applicant filed an application (Japanese patent application No. 62-44797) and proposed a navigation apparatus which is capable of preventing generation of distance measurement errors by correcting the measurement errors each time it is detected that the vehicle has turned left or right on a predetermined course to its destination. However, this navigation apparatus still suffers from a problem in that, in a case where the vehicle has to travel a long distance before it reaches an intersection where it makes a turn, it is impossible to correct the present position (travelled distance), thereby accumulating measurement errors.

An object of the present invention is to provide a navigation apparatus for a vehicle which is designed to obviate the aforementioned problems of the prior art and which is thus capable of obtaining a correct travelled distance and hence a correct present position even when the vehicle has to travel a long distance before it reaches an intersection where it makes a turn.

SUMMARY OF THE INVENTION

To this end, the present invention provides a navigation apparatus for a vehicle which comprises an odometer for detecting the distance over which the vehicle travels, a radio radiation/reception device for detecting a feature located above a road surface, a road surface sensor for detecting a feature on the road surface, and a storage device for storing the features. In this navigation apparatus, the remaining distance to the feature is calculated using the signal detected by the odometer, and the remaining distance is zeroed when the remaining distance becomes equal to or smaller than a predetermined value and when the feature is detected by the radio radiation/reception device or the road surface sensor. More specifically, the distance from the previous intersection or feature to the next feature is compared with the value detected by the odometer, and the remaining distance to the feature is forcibly zeroed when the difference between these values becomes equal to or smaller than a predetermined value and when the feature is detected by the radar or the road surface sensor.

Thus, in the present invention, each time a feature is detected, the distance measurement errors are corrected. This enables the distance measurement errors to be corrected at the location of each feature, thereby eliminating the accumulation of errors. The measurement errors are generated by the change in the air pressure in the wheel, the wear thereof, oblique travel of the vehicle which is caused by a change in traffic lanes, or slip caused by the quick start or quick control of the vehicle. As a result, even when the vehicle has to travel a long distance before it reaches an intersection where it makes a turn, a correct travelled distance can be obtained, enabling a correct present position to be detected.

DESCRIPTION OF THE PREFERRED EMBODIMENTS

Figure 1:
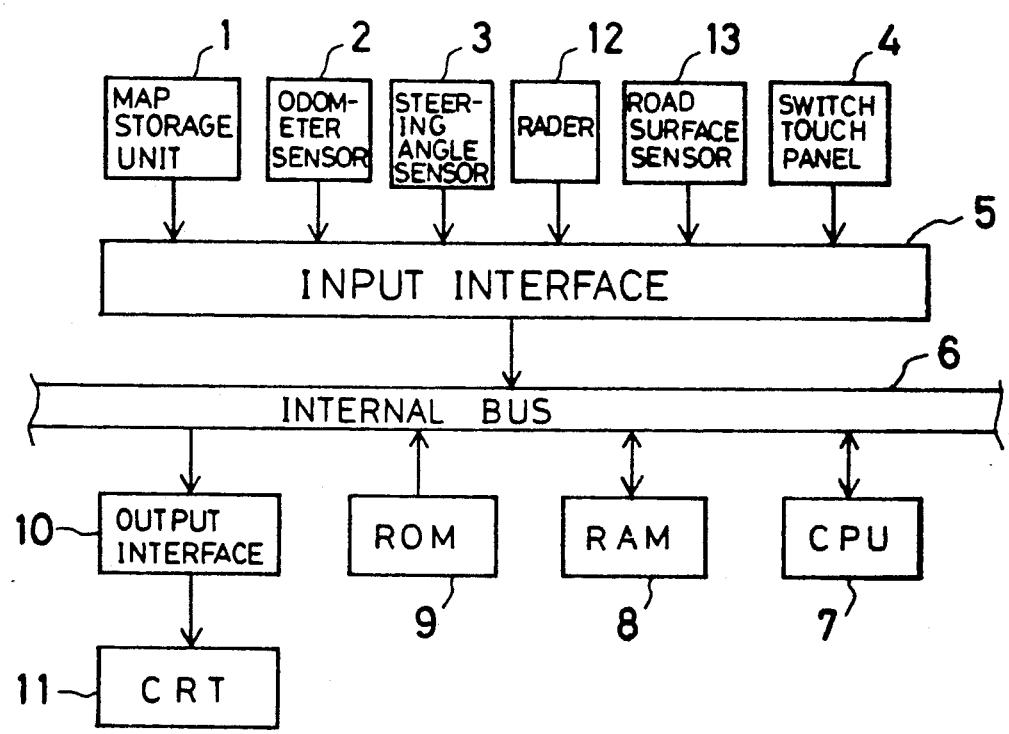
FIG. 1 is a block diagram of a navigation apparatus for a vehicle, showing an embodiment of the present invention.
Figure 8:
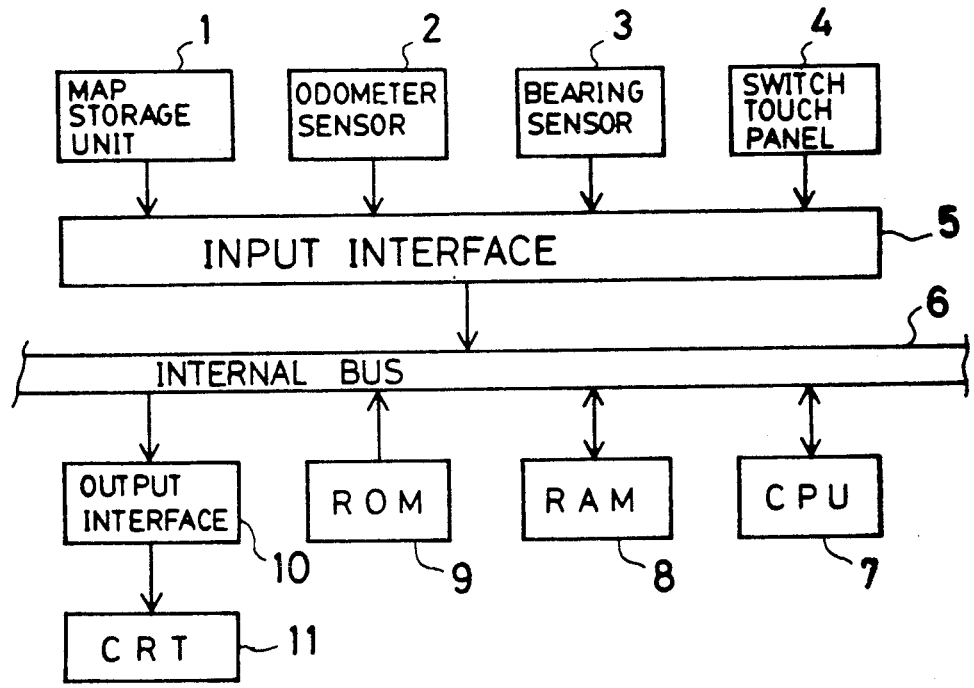
FIG. 8 is a block diagram of a conventional navigation apparatus for a vehicle.
Figure 9:
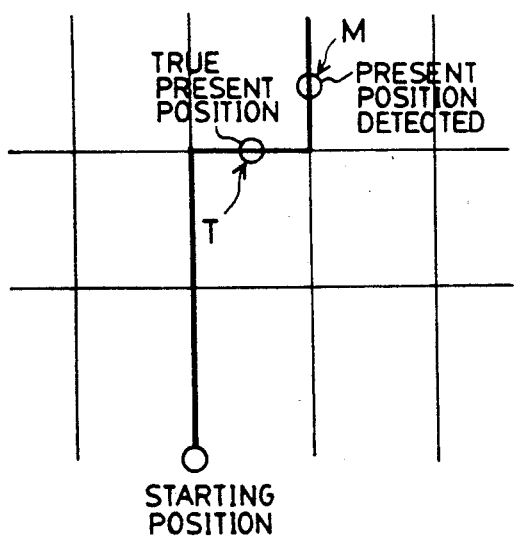
FIG. 9 illustrates the difference between a true position on a course and a detected present position due to the distance measurement errors.
Figure 10:
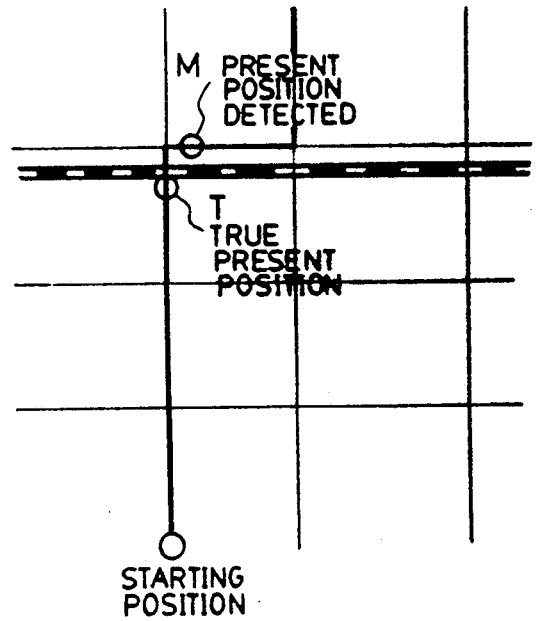
FIG. 10 illustrates the difference between a true position on a course and a detected present position due to the bearing measurement errors.

An embodiment of the present invention will be described below with reference to the accompanying drawings. FIG. 1 is a schematic view of a navigation apparatus for a vehicle. In FIG. 1, the same reference numerals are used to denote parts which are the same as those in FIG. 8, the description thereof being omitted.

In the navigation apparatus according to the present invention, signals from a radar 12 and a road surface sensor 13 are input to an input interface 5. The radar 12 may be a radio radiation/reception device, and the road surface sensor may be a video camera, a light-emitting-/receiving element or the like.

Figure 2:
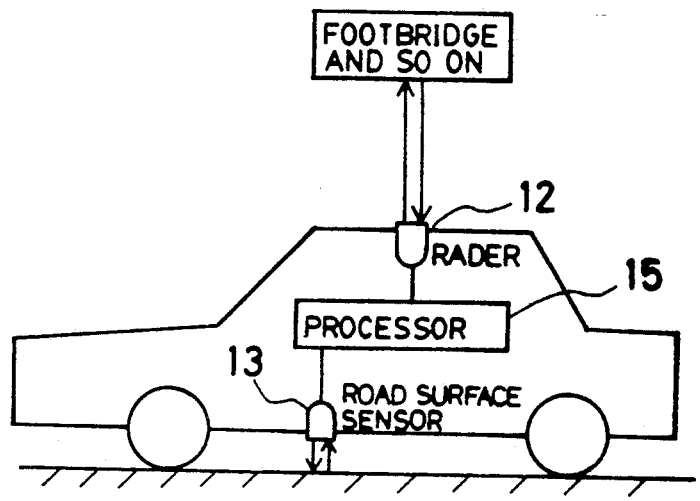
FIG. 2 shows an example of installation of a radar and a road surface sensor.

FIG. 2 shows an example of installation of the radar 12 and the road surface sensor 13. The radar 12 is disposed in the upper portion of the vehicle so that it can detect the features (e.g., tunnels, footbridges and so on) located above the vehicle. The road surface sensor 13 is provided at the bottom of the vehicle so that it can detect the features on the road surface (e.g., the white lines of pedestrian crossings). Both the radar 12 and the road surface sensor 13 are connected to a processing unit 15.

Figure 3:
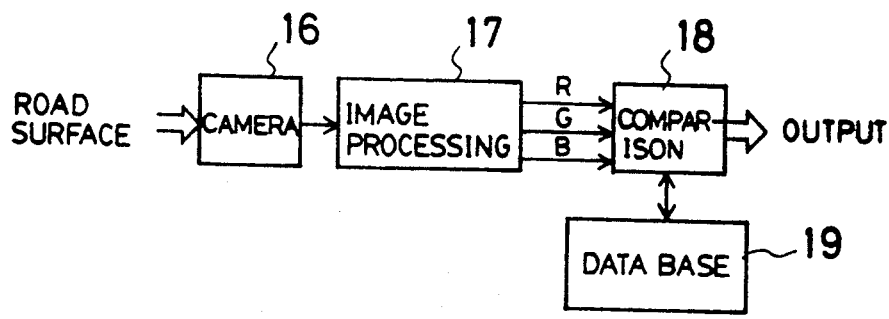
FIGS. 3 and 4 are block diagrams, explaining the operation of the processing unit of FIG. 2.

FIG. 3 shows how the processing unit 15 processes the signal from the road surface sensor. Image data for the feature on the road surface which is obtained by a camera 16 is processed by an image processing unit 17, and resultant primary color data R, G and B is compared with data base 19 of the features on the road surface which is stored beforehand so as to output a signal representing the feature on the road surface.

Figure 4:
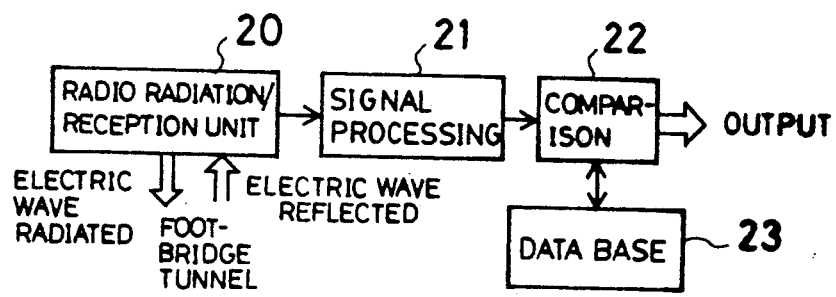

FIG. 4 shows how the processing unit 15 processes a signal from the radar. An electric wave radiated by the radio radiation/reception device 20 is reflected by the feature such as a tunnel, a footbridge or the like, and the reflected electric wave which is input is processed by a signal processing unit 21. The resultant signal is compared with data contained in data base 23 for the features located above the vehicle so as to output a signal representing a feature.

Figure 5:
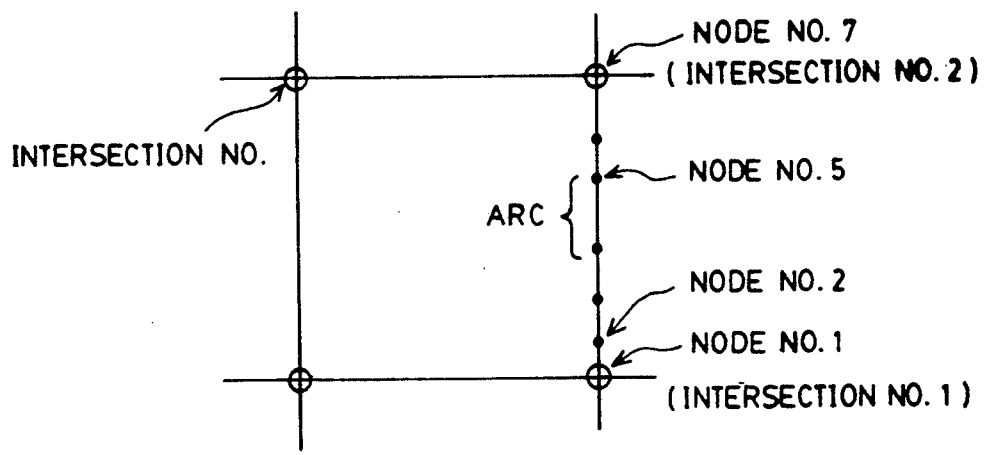
FIG. 5 and 6 illustrate the data structure of the present invention.
Figure 6:
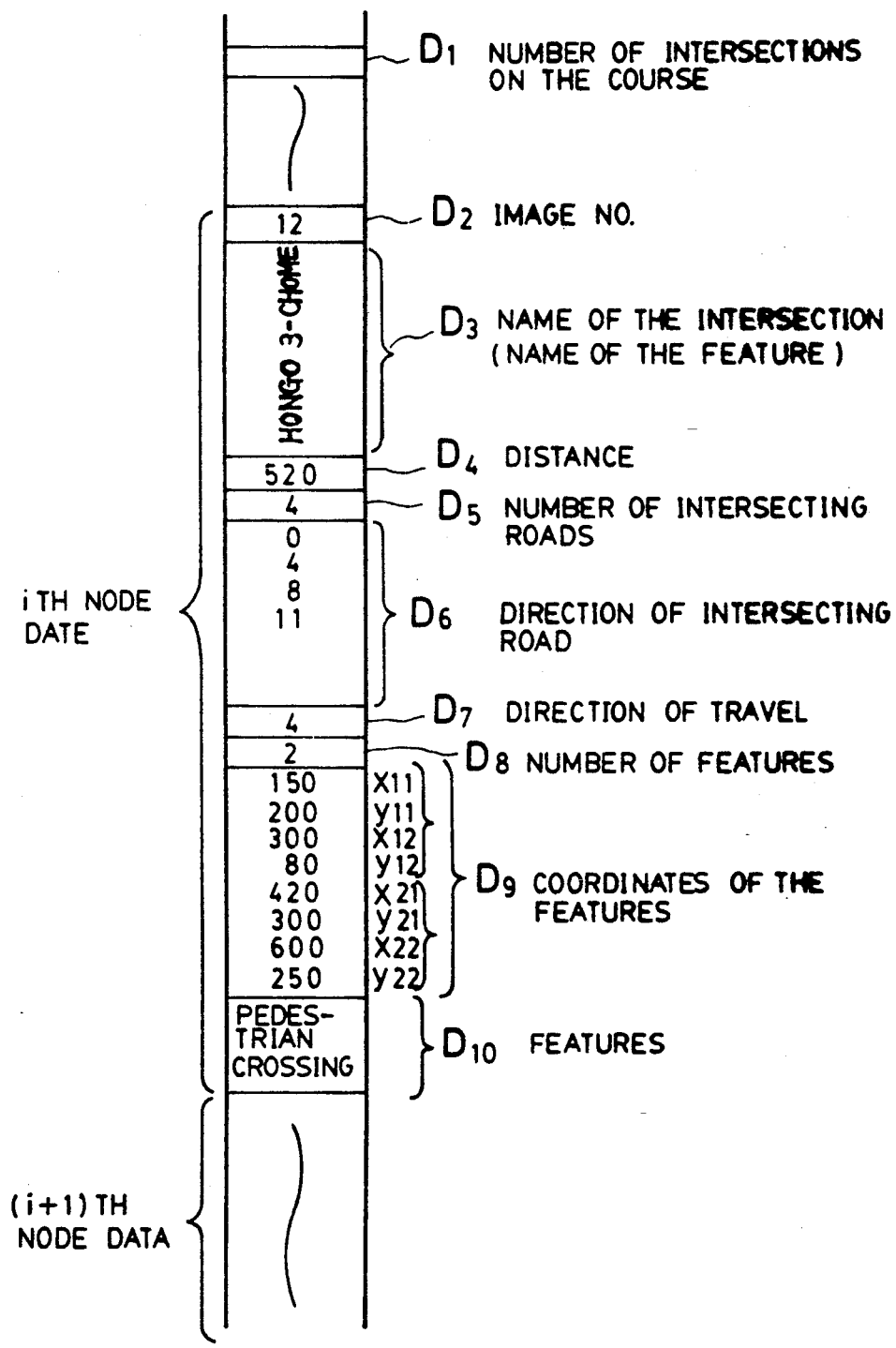

FIGS. 5 and 6 illustrate the data structure adopted in the present invention.

FIG. 5 shows the concept of the structure of map data. A map is depicted in a pictorial form using nodes which represent intersections and the effective guide information between the adjacent intersections (e.g., bridges, rivers, buildings, the road surface features, such as pedestrian crossings, and the features located above the road, such as tunnels and footbridges). The adjacent nodes are connected by arcs. The nodes appear as dots on the map coordinate. The intersections are part of nodes.

FIG. 6 shows the structure of the node data. In FIG. 6, $D_1$ is the number of intersections on the course that a vehicle makes a turn before it reaches a destination, $D_2$ is an image No. at a node, which is the address of the image at the corresponding node within a landscape image storage device (not shown), $D_3$ is the name of the intersection or the feature, $D_4$ is the distance from (i-1)th node to ith node, $D_5$ is the number of intersecting roads, which may be 3 in the case of a three-forked road, $D_6$ is the data on the direction of the intersecting roads, $D_7$ is the data on the direction in which the vehicle travels; $D_8$ is the number of features at the intersection, $D_9$ is the coordinates of the feature used to display it, which may be the x and y coordinates of the two vertices on the diagonal of a square that surrounds the feature in the landscape image of the intersection, and $D_{10}$ is the road surface features, such as a pedestrian crossing, or the features located above the road surface, such as a tunnel and a footbridge, at a node. The ith node is represented by the data $D_2$ to $D_{10}$.

Figure 7:
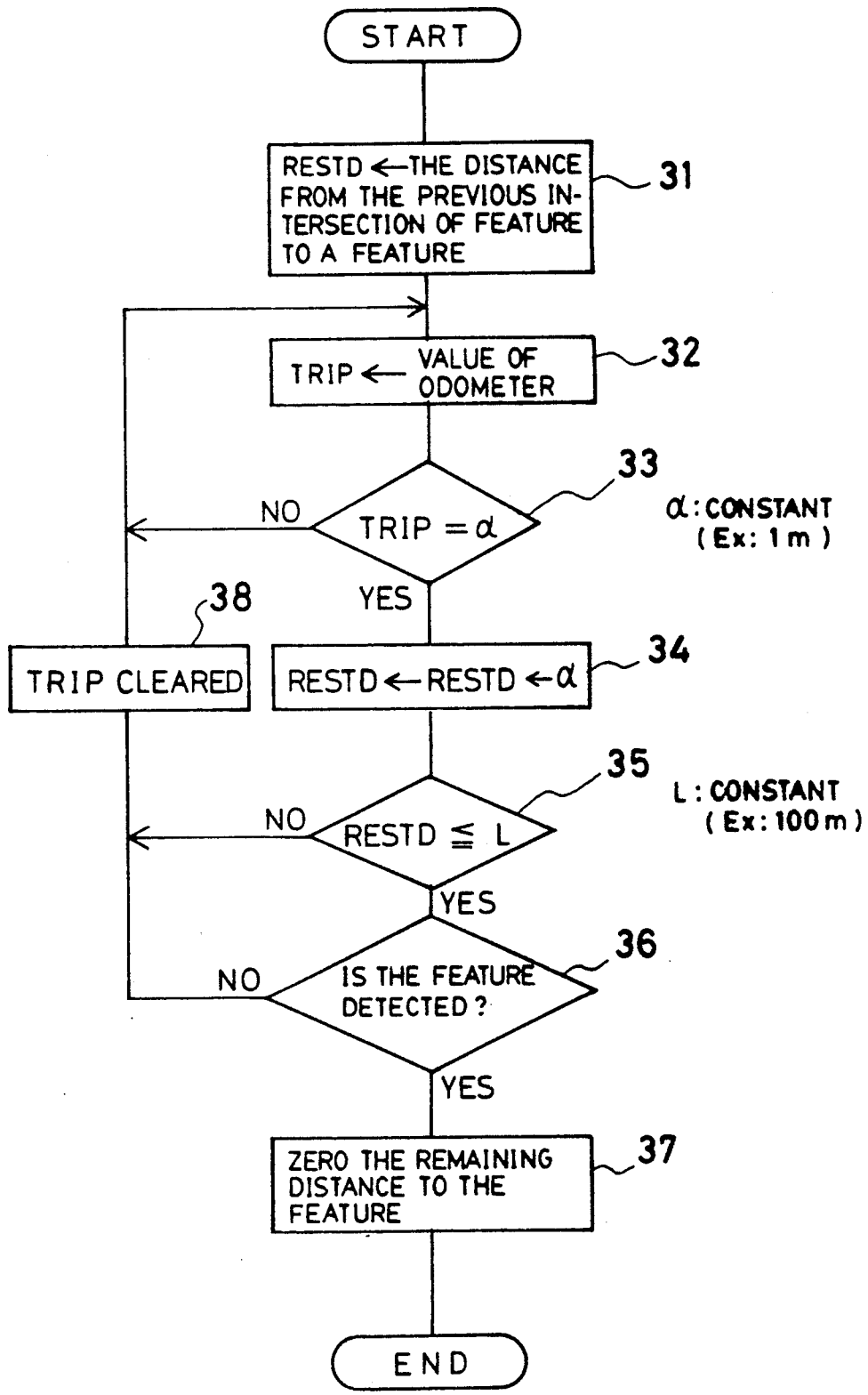
FIG. 7 is a flowchart of the processing carried out by the navigation apparatus according to the present invention.

FIG. 7 is a flowchart of the processing carried out by the navigation apparatus for the vehicle according to the present invention.

First, in step 31, the distance from the previous intersection or feature to the succeeding feature is registered in RESTD. Next, the value from the odometer is input in TRIP, and it is then determined in step 33 whether or not the value in TRIP is equal to a constant $\alpha$ (e.g., 1 m). If the value in TRIP is not equal to $\alpha$, the processing returns to step 32. If they are equal, the remaining distance to the feature is operated by subtracting the constant $\alpha$ from the distance in RESTD in step 34. Next, in step 35, it is determined whether or not RESTD is equal to or smaller than a constant L (e.g., 100 m). If the answer is no, TRIP is cleared in step 38, and then the processing returns to step 32. Thereafter, the above-described processing is repeated until RESTD becomes equal to or smaller than the constant L (e.g., 100 m). Once RESTD has become equal to or smaller than the constant L (e.g., 100 m), it is determined in step 36 whether or not the feature is detected by the radar 12 or the road surface sensor 13. If the answer is no, the processing returns to step 32. If the answer is yes, the remaining distance to the feature is forcibly zeroed in step 37.

What is claimed is:

1. A vehicle-mounted navigation system comprising:
a map storage unit containing stored map data and means for displaying a desired map area image read from said map storage unit;
travel distance selection means for detecting the distance travelled by the vehicle;
present position calculating means for calculating a present position of the vehicle on a predetermined course responsive to the detected travel distance and means for displaying said calculated present position on said map area display;
feature detection means for detecting a stationary feature as the vehicle passes over or under said stationary feature and for generating a detection signal for the detected feature said feature detection means comprising a camera which generates a color video signal and an image processing unit which converts said color video signal into detected color data;
a database containing predetermined feature data for identifying said stationary feature, said predetermined feature data comprising predetermined color data for various road surface features;

comparing means for comparing said detected color data with said predetermined color data to identify said detected stationary feature and for generating a feature representing signal;

proximity determining means for determining the remaining distance between said calculated present position and a succeeding feature, for comparing said remaining distance with a constant and for generating a proximity signal when said remaining distance is equal to or smaller than said constant; and correcting means for correcting said displayed calculated present position responsive to said proximity signal and said feature representing signal.

2. A navigation system according to claim 1 wherein said feature detecting means further comprises radar including a radio radiation and reception device.

3. A navigation system according to claim 1 wherein said feature detection means further comprises overhead feature detection means for detecting features located above the vehicle and said data base further contains predetermined data for overhead features.

4. A navigation system according to claim 1 wherein said travel distance detection means comprises an odometer and a bearing sensor for detecting vehicle direction.

5. A navigation system according to claim 4 wherein said bearing sensor is a steering angle sensor.

6. A navigation system according to claim 1 wherein said correcting means sets said remaining distance at zero whereby said calculated present position is changed to that stored for the detected feature.

7. A navigation system according to claim 1 further comprising selecting means for inputting a selected destination into said map storage unit.

8. A process for guiding a vehicle comprising:

storing data for a map and various predetermined features in a memory, said data identifying said various predetermined features and including color data for various road surface features;

selecting a destination;

displaying a map area showing a predetermined course to the selected destination;

measuring the distance travelled by the vehicle;

calculating the present position of the vehicle on a predetermined course based on the measured travel distance and displaying the calculated present position on said map display;

detecting a stationary feature with a camera as the vehicle passes over said stationary feature and generating a color video signal; converting said color video signal into detecting color data with an image processing unit comparing said detecting color data with the stored data to identify said detected stationary feature and generating a feature representing signal;

correcting the displayed calculated present position in accordance with said feature representing signal.

9. The process of claim 8 additionally comprising calculating the remaining distance between a predetermined feature identified by the stored data and said calculated present position, comparing said remaining distance with a constant and correcting only when said remaining distance is equal to or smaller than said constant.

* * * * *